United States Patent
Pagot et al.

(10) Patent No.: US 7,942,129 B2
(45) Date of Patent: May 17, 2011

(54) METHOD OF CONTROLLING A SPARK-IGNITION SUPERCHARGED INTERNAL-COMBUSTION ENGINE, NOTABLY OF GASOLINE TYPE

(75) Inventors: Alexandre Pagot, Rueil Malmaison (FR); Bertrand Lecointe, Nanterre (FR)

(73) Assignee: Institut Francais du Petrole, Cedex (FR)

( * ) Notice: Subject to any disclaimer, the term of this patent is extended or adjusted under 35 U.S.C. 154(b) by 57 days.

(21) Appl. No.: 11/721,990

(22) PCT Filed: Dec. 19, 2005

(86) PCT No.: PCT/FR2005/003259
§ 371 (c)(1),
(2), (4) Date: Sep. 28, 2009

(87) PCT Pub. No.: WO2006/067338
PCT Pub. Date: Jun. 29, 2006

(65) Prior Publication Data
US 2010/0006067 A1    Jan. 14, 2010

(30) Foreign Application Priority Data
Dec. 21, 2004  (FR) ...................... 04 13681

(51) Int. Cl.
*F02B 1/06* (2006.01)
*F02B 15/00* (2006.01)
(52) U.S. Cl. ...................... 123/432
(58) Field of Classification Search .......... 123/432, 123/304, 575, 308, 309
See application file for complete search history.

(56) References Cited

U.S. PATENT DOCUMENTS

| | | | |
|---|---|---|---|
| 5,050,557 A * | 9/1991 | Ishida et al. | 123/432 |
| 5,094,210 A * | 3/1992 | Endres et al. | 123/432 |
| 5,138,989 A | 8/1992 | Fraidl et al. | |
| 5,237,973 A * | 8/1993 | Oda | 123/432 |
| 5,417,190 A * | 5/1995 | Ando et al. | 123/432 |
| 5,553,580 A * | 9/1996 | Ganoung | 123/432 |
| 6,722,344 B2 * | 4/2004 | Ashida et al. | 123/432 |
| 7,472,679 B2 * | 1/2009 | Yamashita et al. | 123/432 |
| 2003/0196641 A1 | 10/2003 | Ashida et al. | |
| 2006/0272623 A1 * | 12/2006 | Pagot | 123/432 |
| 2007/0034192 A1 * | 2/2007 | Kamio et al. | 123/432 |
| 2007/0215110 A1 * | 9/2007 | Stein et al. | 123/432 |

FOREIGN PATENT DOCUMENTS

| | | |
|---|---|---|
| EP | 0 390 589 A2 | 10/1990 |
| EP | 0 531 541 A1 | 3/1993 |
| EP | 1 172 539 A2 | 1/2002 |
| FR | 2 720 113 A1 | 11/1995 |
| JP | 56-126617 | 10/1981 |

* cited by examiner

*Primary Examiner* — Hieu T Vo
*Assistant Examiner* — Arnold Castro
(74) *Attorney, Agent, or Firm* — Antonelli, Terry, Stout & Kraus, LLP.

(57) ABSTRACT

The present invention relates to a method of controlling a spark-ignition supercharged internal-combustion engine, notably of gasoline type, comprising at least one cylinder (12) with a combustion chamber (14), at least two intake means (24, 26), at least one fuel injection means (40, 42), at least one exhaust means (28, 30) and an ignition means (52).
According to the invention, the method consists in preparing a fuel mixture with a fuel/air ratio greater than or equal to 1, another fuel mixture is prepared with a fuel/air ratio below 1, the two fuel mixtures are fed into the combustion chamber so as to obtain a part (C1) of this chamber containing a fuel mixture with the fuel/air ratio greater than or equal to 1 and the remaining part (C2) of the chamber containing the fuel mixture with the fuel/air ratio below 1.

14 Claims, 1 Drawing Sheet

METHOD OF CONTROLLING A SPARK-IGNITION SUPERCHARGED INTERNAL-COMBUSTION ENGINE, NOTABLY OF GASOLINE TYPE

FIELD OF THE INVENTION

The present invention relates to a spark-ignition supercharged internal-combustion engine control method.

It more particularly relates to such engines with indirect fuel injection.

BACKGROUND OF THE INVENTION

Document FR-2,720,113 notably discloses an indirect-injection internal-combustion engine with one cylinder and two intake manifolds opening each into the combustion chamber and associated with shutoff means such as a valve for communicating each manifold with the combustion chamber. Each manifold is equipped with at least one fuel injection means such as an injection nozzle allowing fuel to be fed into the manifold and thus a fuel mixture to be obtained at the outlet of this manifold.

In this type of engine, a fuel mixture is formed upstream from the combustion chamber in at least one pipe so as to meet the running conditions of the engine. More precisely, at low loads, one of the manifolds is closed whereas the other remains open by injecting therein fuel in sufficient amount to obtain a homogeneous fuel mixture with a fuel/air ratio close to 1, then this mixture is fed into the combustion chamber. For average loads, the two manifolds are open and one of the manifolds is supplied with fuel so as to obtain a fuel mixture having a fuel/air ratio of substantially 1, whereas the fuel is not fed into the other manifold. This allows to have a stratification between the fuel mixture with a fuel/air ratio of 1 and the uncarbureted fluids (recirculated burnt gas and/or air) fed into the combustion chamber through the manifolds. In the case of high loads, the two manifolds are supplied with fuel so as to obtain a homogeneous mixture with a fuel/air ratio close to 1 in the combustion chamber.

In any case, the engine performance capacities cannot be used at their maximum and the mixture fed into the combustion chamber does not allow engine knock risks to be limited. Furthermore, in case of fuel mixture and uncarbureted fluid stratification as mentioned above for average loads, filling of the combustion chamber is poor considering that only part of this chamber is occupied by a fuel mixture. Moreover, for low or high loads, the fuel mixture fed into the chamber is a homogeneous mixture with a fuel/air ratio close to 1. Such a fuel/air ratio is favourable to local self-ignition (engine knock) considering the location of part of the fuel mixture at a distance from the spark plug and consequently at a distance from the ignition initiation of this fuel mixture.

The present invention aims to overcome the aforementioned drawbacks by means of an internal-combustion engine control method allowing to use the entire potential of the engine while avoiding creating zones in the combustion chamber favouring engine knock.

SUMMARY OF THE INVENTION

The present invention thus relates to a method of controlling a spark-ignition supercharged internal-combustion engine, notably of gasoline type, comprising at least one cylinder with a combustion chamber, at least two intake means, at least one fuel injection means, at least one exhaust means and an ignition means, characterized in that it comprises:

preparing a fuel mixture with a fuel/air ratio greater than or equal to 1, preparing another fuel mixture with a fuel/air ratio below 1, feeding the two fuel mixtures into the combustion chamber so as to obtain a part of this chamber containing a fuel mixture with the fuel/air ratio greater than or equal to 1 and the remaining part of the chamber containing the fuel mixture with the fuel/air ratio below 1.

Preferably, the two fuel mixtures can be fed simultaneously into the combustion chamber.

Advantageously, the ignition means can be arranged in the part of the chamber containing the fuel mixture with the fuel/air ratio greater than or equal to 1.

It is also possible to feed at least one of the fuel mixtures with a gyration motion into the combustion chamber.

It is possible to introduce at least one of the fuel mixtures with a gyration motion along a horizontal axis, referred to as tumble.

The fuel can be injected simultaneously into each intake means.

BRIEF DESCRIPTION OF THE FIGURES

Other features and advantages of the invention will be clear from reading the description hereafter of embodiments given by way of non limitative examples, with reference to the accompanying figures wherein.

DETAILED DESCRIPTION

Figure 1:
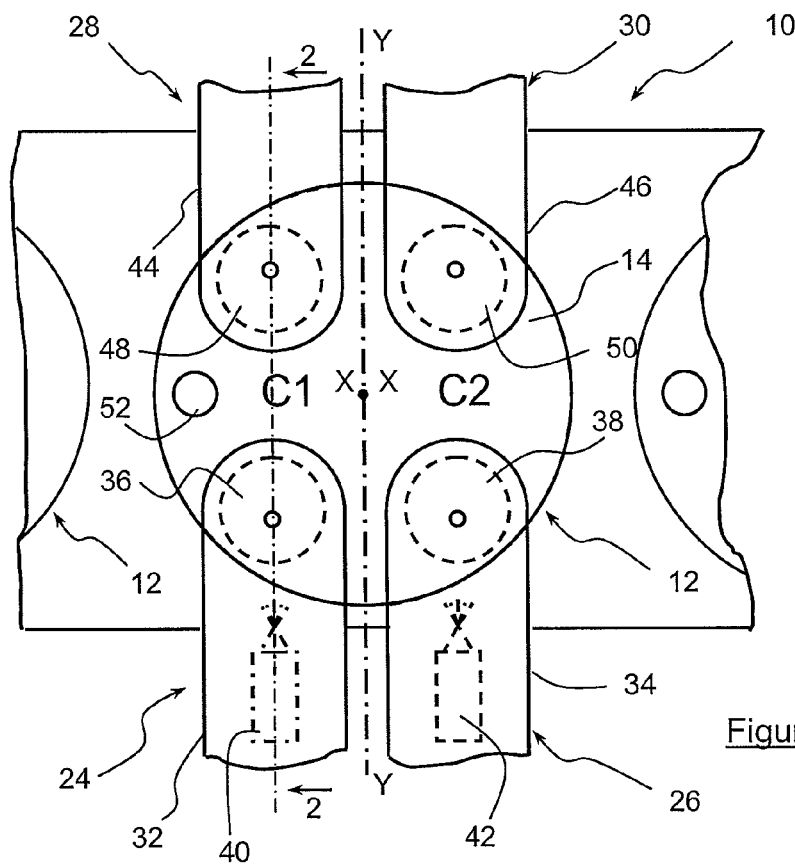
FIG. 1 diagrammatically shows, in top view, a cylinder of an engine using the method according to the invention.
Figure 2:
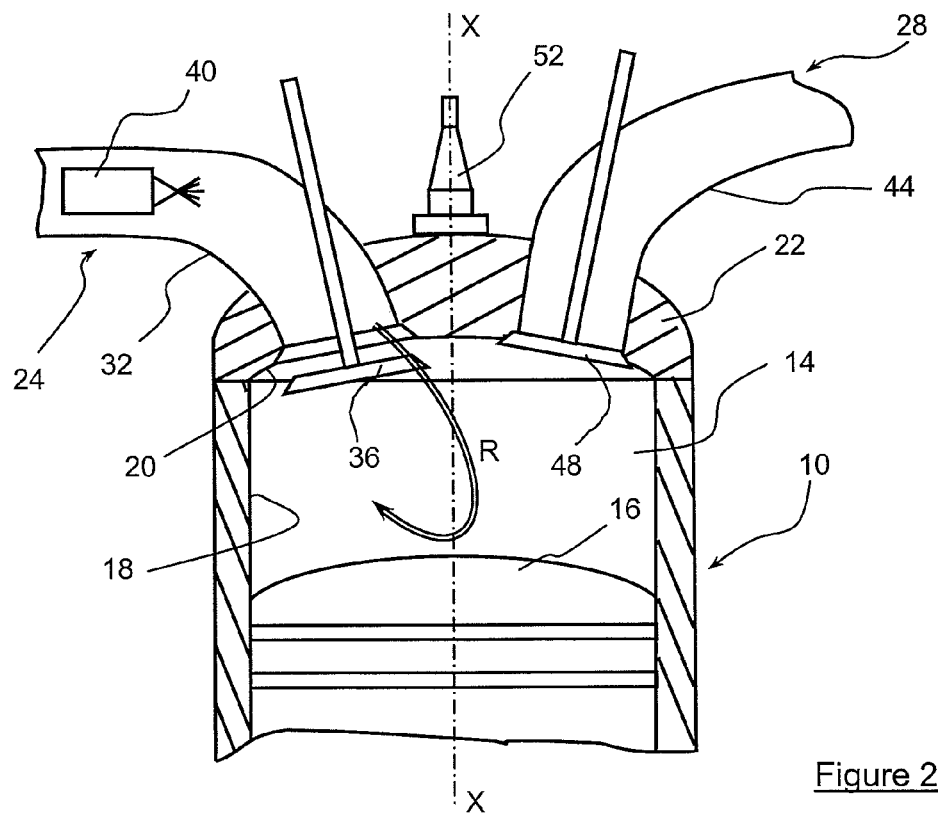
FIG. 2 is partial sectional view along line 2-2 of the cylinder of FIG. 1.

FIGS. 1 and 2 show an indirect fuel injection spark-ignition supercharged internal-combustion engine 10 comprising at least one cylinder 12 of longitudinal axis XX (FIG. 2). This cylinder comprises a combustion chamber 14 delimited by the top of a piston 16 subjected to a reciprocating translation motion, lateral wall 18 of the cylinder and surface 20 of a cylinder head 22 usually closing the cylinder.

At least two separate intake means 24 and 26 and at least one exhaust means, here two exhaust means 28 and 30, open into the combustion chamber. The intake means comprise each a manifold 32, 34 carrying a shutoff means for closing the outlet of the manifold opening into the combustion chamber, such as a valve 36, 38. A fuel supply means such as an injection nozzle 40 and 42 preferably carried by each manifold allows fuel to be fed into the manifold upstream from the intake valve. The exhaust means comprise each an exhaust manifold 44 and 46 provided with an exhaust valve 48 and 50. As shown in the figures, the intake and exhaust means are arranged in such a way that an exhaust means is substantially opposite an intake means while being included in the same cylinder portion and more particularly in a single half cylinder. The cylinder therefore has to be virtually separated into two parts by a vertical plane passing through axis XX and developing along the direction of axis YY of FIG. 1, thus delimiting two half cylinders C1 and C2, half cylinder C1 being on the left in FIG. 1 whereas half cylinder C2 is on the right. Each half cylinder thus contains an intake means and an exhaust means, 24, 28 and 26, 30 respectively.

The cylinder head also carries an ignition means 52 such as a spark plug to provide ignition of the fuel mixture present in the combustion chamber. This spark plug is advantageously arranged in half cylinder C1 for reasons explained in the description hereafter.

At least intake manifold 32 of half cylinder C1 has such a direction that it allows to give a gyration motion along a horizontal axis to the fuel mixture once it has been fed into combustion chamber 14. This gyration motion, more commonly referred to as tumble, as illustrated by arrow R of FIG. 2, is a rotating motion of the fuel mixture running on from intake manifold 32 and around an axis that is substantially perpendicular to axis XX of cylinder 12. Advantageously, but not necessarily, intake manifold 34 in the other half cylinder C2 has such a direction that it also allows the fuel mixture it carries to be introduced with a tumble type gyration motion.

During operation and during the intake phase of the engine, exhaust valves 48 and 50 are conventionally closed. Intake valves 36 and 38 are open and an intake fluid such as supercharged air or a mixture of supercharged air and recirculated burnt gases (EGR) circulates in intake manifolds 32 and 34. Fuel injection nozzles 40 and 42 are controlled in such a way that nozzle 40 delivers a sufficient amount of fuel into manifold 32 for the fuel mixture fed into the combustion chamber to be a rich mixture or at least stoichiometric, i.e. with a fuel/air ratio greater than or equal to 1. The other nozzle 42 is controlled in such a way that introduction of the fuel into the manifold allows a lean fuel mixture to be obtained, i.e. with a fuel/air ratio below 1, which is also fed into the combustion chamber.

The gyration motion of the fuel mixture at the outlet of manifold 32 allows to obtain a distinct separation in the combustion chamber of the two fuel mixtures by stratification between the left part (half cylinder C1) and the right part (half cylinder C2), although the lean fuel mixture from manifold 34 is not subjected to a tumble motion.

The rich fuel mixture is therefore in half cylinder C1 which preferably carries the spark plug and combustion of the fuel mixture will take place more rapidly. This combustion will proceed in the other half cylinder without the knocking combustion phenomenon being able to occur.

Of course, without departing from the scope of the invention, the lean fuel mixture can be fed into the combustion chamber with a gyration motion referred to as tumble in order to intensify even further stratification of the fuel mixtures.

The present invention is not limited to the example described and it encompasses any variant and equivalent.

Notably, it may be considered using the method of French patent application No. 2,720,113 described above by adapting it to the method of the present invention for supercharged internal-combustion engines.

The invention claimed is:

1. A method of controlling a spark-ignition internal-combustion engine comprising at least one cylinder with a combustion chamber, at least two intake means, at least one fuel injection means, at least one exhaust means and an ignition means, characterized in that it comprises:
preparing a rich fuel mixture comprising fuel and supercharged air,
preparing a lean fuel mixture comprising fuel and supercharged air,
feeding the rich fuel mixture and the lean fuel mixture into the combustion chamber so as to obtain a part of this chamber containing the rich fuel mixture and the remaining part of the chamber containing the lean fuel mixture.

2. The method of controlling a spark-ignition internal-combustion engine control engine as claimed in claim 1, characterized in that the rich fuel mixture and the lean fuel mixture are fed simultaneously into the combustion chamber.

3. The method of controlling a spark-ignition internal-combustion engine control engine as claimed in claim 1, characterized in that ignition means is arranged in the part of the chamber containing the rich fuel mixture.

4. The method of controlling a spark-ignition internal-combustion engine control engine as claimed in claim 1, characterized in that at least one of the fuel mixtures is fed with a gyration motion into combustion chamber.

5. The method of controlling a spark-ignition internal-combustion engine control engine as claimed in claim 4, characterized in that at least one of the fuel mixtures is introduced with a gyration motion along a horizontal axis, referred to as tumble.

6. The method of controlling a spark-ignition internal-combustion engine control engine as claimed in claim 1, characterized in that the fuel is injected simultaneously into each intake means.

7. The method of controlling a spark-ignition internal-combustion engine control engine as claimed in claim 1, wherein the rich fuel mixture comprises fuel, supercharged air and recirculated burnt gases and the lean fuel mixture comprises fuel, supercharged air and recirculated burnt gases.

8. The method of controlling a spark-ignition internal-combustion engine control engine as claimed in claim 1, wherein the fuel is gasoline.

9. The method of controlling a spark-ignition internal-combustion engine control engine as claimed in claim 3, characterized in that the rich fuel mixture and the lean fuel mixture are fed simultaneously into the combustion chamber.

10. The method of controlling a spark-ignition internal-combustion engine control engine as claimed in claim 3, characterized in that at least one of the fuel mixtures is fed with a gyration motion into combustion chamber.

11. The method of controlling a spark-ignition internal-combustion engine control engine as claimed in claim 10, characterized in that at least one of the fuel mixtures is introduced with a gyration motion along a horizontal axis, referred to as tumble.

12. The method of controlling a spark-ignition internal-combustion engine control engine as claimed in claim 3, characterized in that the fuel is injected simultaneously into each intake means.

13. The method of controlling a spark-ignition internal-combustion engine control engine as claimed in claim 3, wherein the rich fuel mixture comprises fuel, supercharged air and recirculated burnt gases and the lean fuel mixture comprises fuel, supercharged air and recirculated burnt gases.

14. The method of controlling a spark-ignition internal-combustion engine control engine as claimed in claim 3, wherein the fuel is gasoline.

* * * * *